United States Patent
Schoenherr et al.

(10) Patent No.: US 9,127,590 B2
(45) Date of Patent: Sep. 8, 2015

(54) TURBOCHARGER

(75) Inventors: Werner Schoenherr, Selters (DE);
Stephan Maier, Muensingen (DE)

(73) Assignee: ElringKlinger AG, Dettingen (DE)

( * ) Notice: Subject to any disclaimer, the term of this patent is extended or adjusted under 35 U.S.C. 154(b) by 238 days.

(21) Appl. No.: 13/478,911

(22) Filed: May 23, 2012

(65) Prior Publication Data

US 2012/0317975 A1 Dec. 20, 2012

(30) Foreign Application Priority Data

Jun. 17, 2011 (DE) .......................... 10 2011 077 766
Feb. 17, 2012 (DE) .......................... 10 2012 101 322

(51) Int. Cl.
| | |
|---|---|
| F02D 23/00 | (2006.01) |
| F02B 33/44 | (2006.01) |
| F16K 25/00 | (2006.01) |
| F16K 31/44 | (2006.01) |
| F02B 37/18 | (2006.01) |

(52) U.S. Cl.
CPC ............. *F02B 37/183* (2013.01); *Y02T 10/144* (2013.01)

(58) Field of Classification Search
USPC ............. 251/85, 86, 298, 278, 269, 279, 337; 60/605.2
See application file for complete search history.

(56) References Cited

U.S. PATENT DOCUMENTS

| | | | |
|---|---|---|---|
| 3,695,777 A * | 10/1972 | Westphal et al. .......... 415/208.1 |
| 3,893,786 A | 7/1975 | Rahnke et al. | |
| 4,893,474 A | 1/1990 | Miller et al. | |
| 5,146,753 A | 9/1992 | Potter | |
| 5,158,305 A | 10/1992 | Halling | |
| 5,172,552 A | 12/1992 | Elpern et al. | |
| 5,378,001 A * | 1/1995 | Miyaoh .......................... 277/595 |
| 6,168,166 B1 | 1/2001 | Akimoto | |
| 6,168,167 B1 | 1/2001 | Aoki | |
| 7,080,510 B2 * | 7/2006 | Ishihara et al. ................. 60/602 |
| 7,644,583 B2 | 1/2010 | Leavesley | |
| 8,474,257 B2 * | 7/2013 | Yoshimoto et al. ............. 60/602 |
| 8,579,579 B2 * | 11/2013 | Castan et al. .................. 415/160 |

(Continued)

FOREIGN PATENT DOCUMENTS

| | | |
|---|---|---|
| DE | 102007018618 A1 | 10/2007 |
| DE | 102009030520 A1 * | 1/2010 |

(Continued)

OTHER PUBLICATIONS

DE 102007018618 English Translation.*

*Primary Examiner* — Thomas Denion
*Assistant Examiner* — Jessica Kebea
(74) *Attorney, Agent, or Firm* — Leydig, Voit & Mayer, Ltd.

(57) ABSTRACT

Turbocharger provided with a bypass valve device comprising a valve element having a shaft movably connected to a valve element support, with a spindle between the valve element support and an adjusting lever extending transversely to the spindle, and an adjusting lever actuating element pivotably connected to the adjusting lever; an annular spring element is provided in at least one of a first position between the valve element and the valve element support and a second position between the adjusting lever and the adjusting lever actuating element, the spring element comprising at least one annular spring steel disc with a bead being configured and dimensioned so as to minimize play between the valve element and its support or between the adjusting lever and its actuating element.

8 Claims, 8 Drawing Sheets

(56) References Cited

U.S. PATENT DOCUMENTS

| | | | |
|---|---|---|---|
| 2003/0230858 A1* | 12/2003 | Matsuki et al. | 277/594 |
| 2004/0113370 A1* | 6/2004 | Beutter et al. | 277/591 |
| 2007/0013148 A1* | 1/2007 | Blessing et al. | 277/637 |
| 2007/0120330 A1* | 5/2007 | Imai | 277/591 |
| 2009/0001672 A1* | 1/2009 | Takahashi et al. | 277/595 |
| 2010/0327540 A1 | 12/2010 | Okano et al. | |
| 2011/0318168 A1* | 12/2011 | Kiefer | 415/148 |
| 2012/0055154 A1* | 3/2012 | Ebert | 60/602 |
| 2012/0216534 A1* | 8/2012 | Werstat et al. | 60/611 |
| 2012/0319020 A1* | 12/2012 | Doehler et al. | 251/214 |
| 2013/0034377 A1* | 2/2013 | Friedow et al. | 403/23 |
| 2013/0134683 A1* | 5/2013 | Hong et al. | 277/594 |

FOREIGN PATENT DOCUMENTS

| | | | | |
|---|---|---|---|---|
| DE | 102010043147 A1 * | 10/2011 | | |
| DE | 102010049466 A1 | 4/2012 | | |
| DE | 102011075201 A1 * | 11/2012 | | |
| DE | 102011077626 A1 * | 12/2012 | | |
| DE | 102011079573 A1 * | 1/2013 | | |
| DE | 102011083369 A1 * | 3/2013 | | |
| DE | 102012216893 A1 * | 4/2013 | ............... | F16K 1/18 |
| DE | 102011088034 A1 * | 6/2013 | | |
| DE | 102012204497 A1 * | 9/2013 | | |
| DE | 102012105402 A1 * | 12/2013 | | |
| EP | 1009926 B1 * | 11/2001 | | |
| FR | 2582735 * | 5/1985 | | |
| JP | 2005226591 A * | 8/2005 | | |
| JP | 2011-043119 A | 3/2011 | | |
| WO | WO 2010/135104 A2 | 11/2010 | | |
| WO | WO 2010135104 A2 * | 11/2010 | | |
| WO | WO 2012/052124 A1 | 4/2012 | | |
| WO | WO 2013115206 A1 * | 1/2013 | | |
| WO | WO 2013098884 A1 * | 4/2013 | | |
| WO | WO 2013/098884 A1 * | 7/2013 | ............. | F02B 37/18 |
| WO | WO 2013133371 A1 * | 9/2013 | | |
| WO | WO 2013133376 A1 * | 9/2013 | | |
| WO | WO 2013169507 A1 * | 11/2013 | | |

* cited by examiner

TURBOCHARGER

The present disclosure relates to the subject matter disclosed in German application number 10 2012 101 322.5 of Feb. 17, 2012, which is incorporated herein by reference in its entirety and for all purposes.

The invention relates to a turbocharger for a reciprocating-piston internal combustion engine, comprising an exhaust gas bypass path for controlling the size of the volumetric flow of engine exhaust gas acting upon a turbine of the turbocharger, the bypass path being provided with a bypass valve device for controlling the size of the volumetric flow of exhaust gas conducted through the bypass path, the bypass valve device comprising a plate-like valve element (optionally referred to as wastegate flap) which has a sealing surface lying in a plane and a shaft extending away from the sealing surface, and which is movable between an open position and a closed position, a valve seat for the valve element, the valve seat enclosing an exhaust gas through-opening and interacting with the valve element sealing surface, a valve element support to which the valve element is connected by means of its shaft so as to be movable at least in the direction perpendicular to the valve element sealing surface, a spindle which is held rotatably in a bearing bush, and on which is arranged in a rotationally fixed manner, on the one hand, the valve element support and, on the other hand, a first region of an adjusting lever, the first region of the adjusting lever extending transversely to the spindle, and an adjusting lever actuating element which is connected to a second region of the adjusting lever so as to be pivotable relative to the adjusting lever at least about a pivot axis parallel to the axis of the spindle.

Such a turbocharger may be a single turbocharger, but also a turbocharger of a multistage charger system, i.e., a system comprising a plurality of turbochargers.

A turbocharger of the kind defined at the outset is known and is disclosed, for example, in FIG. 1 of WO 2010/135104 A or in FIG. 1 of DE 10 2009 030 520 A.

In a turbocharger of the kind mentioned at the outset, manufacturing tolerances of the components of the bypass valve device, but, above all, the time-dependent temperature changes and different temperatures of the components occurring during operation unavoidably result in a certain play occurring between the valve element and the valve element support and also between the adjusting lever and the adjusting lever actuating element.

Use of an electromechanical drive, which acts upon the adjusting lever actuating element, for actuating the bypass valve has recently increased. This has the advantage of being able to specifically set each intermediate position between the open position and the closed position of the valve element relatively precisely. Above all, when the valve element is a wastegate flap, which performs a pivoting movement between its open position and its closed position, the aforementioned play between the valve element, i.e., the wastegate flap, and the valve element support, also allows the wastegate flap to adapt to the valve seat when the wastegate flap is immediately before its closed position and is then to lie in a sealing manner against the valve seat. It has been found that in certain angular positions of the wastegate flap, this play results in the flow of exhaust gas causing the wastegate flap to perform oscillatory-like movements, which lead to rattling and clattering noises when the turbocharger is in operation at certain engine speeds. These are disadvantageous not only because of the noise but also because of signs of wear caused by the clattering.

Therefore, for a turbocharger of the kind mentioned at the outset, WO 2010/135104 A proposes using, in the region of the connection of the valve element (wastegate flap) to the valve element support, a spring element in the form of a circular ring-shaped spring steel sheet disc through which the valve element shaft passes. In this known bypass valve device, the lever-like valve element support has a hole through which the shaft of the plate-like valve element extends, and a disc-like abutment is attached to the free end of this shaft to secure the valve element to the valve element support. The circular ring-shaped spring steel sheet disc is of conical configuration, i.e., it has the shape of a truncated cone with a circular outer rim and a circular inner rim defining its opening, between which rims the sheet metal has the shape of a hollow truncated cone and (in cross section) is overall flat. In a first embodiment of this known bypass valve device, the spring steel sheet disc is arranged between the plate-like valve element and the valve element support, in a second embodiment between the valve element support and the disc-like abutment attached to the free end of the shaft of the valve element.

In both embodiments, the spring steel sheet disc is pressed with one edge of its outer rim against a flat region of the valve element support and with one edge of its inner rim either against a flat region of the plate-like valve element or a flat region of the disc-like abutment. It has been found that under the high temperatures (exhaust gas temperatures) prevailing in the region of the wastegate flap when the engine is operating, the material of the spring steel sheet disc tends to creep or flow in the region its outer rim and inner rim and, therefore, the spring steel sheet disc shows considerable signs of wear in the course of operation, which negatively affect elimination of the play in the connection between the plate-like valve element and the valve element support.

In the known bypass valve devices of the kind mentioned at the outset, owing to manufacturing tolerances and/or to unavoidable different component temperatures during operation, play in the connection of the adjusting lever to the adjusting lever actuating element is also unavoidable with the result that rattling or clattering noises and signs of wear owing to the play also occur at this position during engine operation.

The object underlying the invention was to at least minimize or even completely eliminate these disadvantages in a bypass valve device of the kind defined at the outset, and, to accomplish this object, it is proposed, in accordance with the invention, that a substantially ring-shaped spring element be arranged in at least one of the following positions:

(A) a $1^{st}$ position in the region of the connection between the valve element and the valve element support, wherein a play in the longitudinal direction of the valve element shaft between the valve element and its support is at least almost eliminated by the spring element through which the valve element shaft passes;

(B) a $2^{nd}$ position in the region of the connection between the adjusting lever and the adjusting lever actuating element, wherein a play in the direction of the pivot axis between the adjusting lever and the adjusting lever actuating element is at least almost eliminated by the spring element through which this pivot axis passes, the spring element comprising at least one substantially ring-shaped spring steel sheet disc with a bead which is resiliently elastic in the direction of the ring axis and encloses the ring axis, and, taking into consideration the spring properties of the spring steel sheet disc, the bead being so configured and dimensioned that the aforementioned play is at least almost eliminated also when the turbocharger is in operation.

In the bypass valve device in accordance with the invention, the spring element does, in accordance with the invention, not lie with rim edges of the at least one spring steel sheet disc against the components of the bypass valve device that are adjacent to the spring element, as is the case with the spring element disclosed in WO 2010/135104 A, but rather the pressing forces acting on the spring element act in accordance with the configuration of the spring element in accordance with the invention at least predominantly or substantially on spring element regions which are spaced in the radial direction from the radially outer rim and the radially inner rim of the spring element: In the case of a full bead, these regions are the crest and the two feet of the full bead, in the case of a half bead they are the two ring-shaped transitions from the half bead to the two ring-shaped regions of the spring steel sheet disc that are adjacent to the half bead. If the spring element in accordance with the invention has only a single spring steel sheet disc, then, in accordance with the invention, in the case of a full bead, its bead crest and the two bead feet of the full bead are pressed against the components of the bypass valve device that are adjacent to the spring element, whereas in the case of a half bead, its two aforementioned transitions (which could also be referred to as bead feet) to the regions of the spring steel sheet disc that are adjacent to the half bead are pressed against the adjacent components. If the spring element comprises two spring steel sheet discs adjacent to each other, then in the case of full beads, either all bead crests or all bead feet are pressed against the adjacent components, whereas in the case of half beads, the one "bead feet" of the two half beads are pressed against the adjacent components, and the two other bead feet against each other or against a ring-shaped inner layer which is arranged between the two beaded cover sheets of the spring element.

Whereas in the known spring element, the pressed edges of the outer rim and the inner rim of the spring steel sheet disc are at least substantially unable to adapt to the adjacent components, a resiliently elastic bead has a relatively good adaptability, as it is relatively easy for regions of the bead to undergo different deformation in its height along its circumference.

If the valve element is not only movable in the longitudinal direction of the shaft of the valve element relative to the valve element support, or if the adjusting lever and the adjusting lever actuating element are not only movable in the direction of the pivot axis of their connection relative to each other, but if, owing to play, the shaft axis can also be tilted relative to the valve element support or the pivot axis relative to the adjusting lever and/or the adjusting lever actuating element, then the spring element in accordance with the invention is preferably so configured that both axial play and play that is present within the meaning of the aforementioned tilting movement are at least almost eliminated by the spring element.

Finally, the invention is suited not only for a bypass valve device in which the valve element performs a pivoting movement between its open position and its closed position, but also for embodiments in which the valve element performs a straight-line movement between its open position and its closed position.

The aforementioned DE 10 2009 030 520 A deals exclusively with a sealing element configured as a ring-shaped spring element, which is arranged between a bearing bush for a spindle carrying a wastegate flap and an adjusting lever attached to the spindle in order to prevent exhaust gases from escaping from the gap between the spindle and its bearing bush. The spring element consists of one or two ring-shaped sheet metal discs and forms at least one resilient sealing lip, which is installed with axial pretensioning in relation to the spindle between the one end face of the bearing bush and the side of the adjusting lever lying opposite to the bearing bush and lies in a gastight sealing manner against the bearing bush and the adjusting lever. In the case of a bypass valve device to which the present invention relates, however, the problem of gas sealing occurs neither in the region of the connection of the valve element to a valve element support nor in the region of the connection between an adjusting lever rotating the spindle and an adjusting lever actuating element.

Above all, when the spring element in accordance with the invention is arranged in the aforementioned $1^{st}$ position, the spring element is exposed to particularly high temperatures during operation, and, therefore, for a spring element mounted in the $1^{st}$ position, use of a spring steel is recommended, which, also under the temperatures prevailing at this position during operation of the turbocharger, has sufficient spring properties for elimination of play, even if these are lower than the spring properties of the spring steel at room temperature. Types of spring steel suited for this will be referred to below, but spring steels made of a nickel-based alloy are particularly recommended.

It is particularly advantageous if the bead of the at least one spring steel sheet disc is configured as a half bead because a half bead has the advantage over a full bead that, given the same or similar spring hardness of the bead, greater spring travel of the spring element (in the direction of its ring axis) can be achieved with a half bead, and, in addition, a spring steel sheet disc provided with a half bead lies at least substantially exclusively with flat ring regions of the sheet metal disc against components adjacent thereto.

Particularly good properties of a spring steel sheet disc in accordance with the invention provided with at least one half bead with respect to its axial spring travel and its axial spring stiffness can be achieved by the half bead being so configured that the width of the half bead measured in the radial direction is a (not necessarily integral) multiple of the height of the half bead measured in the axial direction of the spring element. It is particularly advantageous if the ratio of the height of the half bead measured in the direction of the axis of the spring steel sheet disc to the width of the half bead measured in the radial direction in relation to this axis is between 1:2 and 1:7, preferably between 1:4 and 1:6 and, in particular, about 1:5.

If the valve element shaft passes through a hole (with or without play) provided in the valve element support, and if it is provided with an abutment at its free end, as is the case in the bypass valve device disclosed in WO 2010/135104 A, it has a considerable advantage if a ring-shaped washer, through which the valve element shaft passes, is provided between this abutment and the valve element support, and if the spring element mounted in the $1^{st}$ position is arranged between the abutment, preferably between the washer and the valve element support. By keeping washers of different thickness ready for use and by installing a washer of corresponding thickness, it is, on the one hand, readily possible to compensate for manufacturing tolerances and, on the other hand, to determine and set the pretensioning of the spring element installed in the $1^{st}$ position, which is particularly advantageous when the free end of the valve element shaft, after insertion into the hole in the valve element support, and after the washer has been pushed onto the valve element shaft, is thickened by a kind of riveting procedure so that it forms the said abutment and prevents detachment of the valve element and the washer from the valve element support. Owing to such an arrangement of the spring element, the closing force acting upon the valve element need not be transmitted via the spring element onto the valve element when closing the valve.

The spring element, therefore, serves only to eliminate play and cannot become damaged by too high pressing forces.

A spring element mounted in the $2^{nd}$ position is advantageously arranged between the adjusting lever and the adjusting lever actuating element because it is then protected from damage by these two components.

As mentioned above, nickel-based alloys are particularly well suited, but possibly also cobalt-based alloys, which are more expensive than these, for the at least one spring steel sheet disc in accordance with the invention.

To manufacture the at least one spring steel sheet disc, a corresponding ring-shaped sheet metal disc is first punched out of a metal sheet without spring steel properties and given its final shape (including the at least one bead) by stamping, and the desired spring steel properties and the desired hardness are then imparted to the sheet metal by heat treatment.

Further advantageous features and details of the bypass valve device in accordance with the invention are given in the enclosed subclaims and the appended drawings and the following description of particularly advantageous embodiments of the invention. In the drawings:

Figure 1:
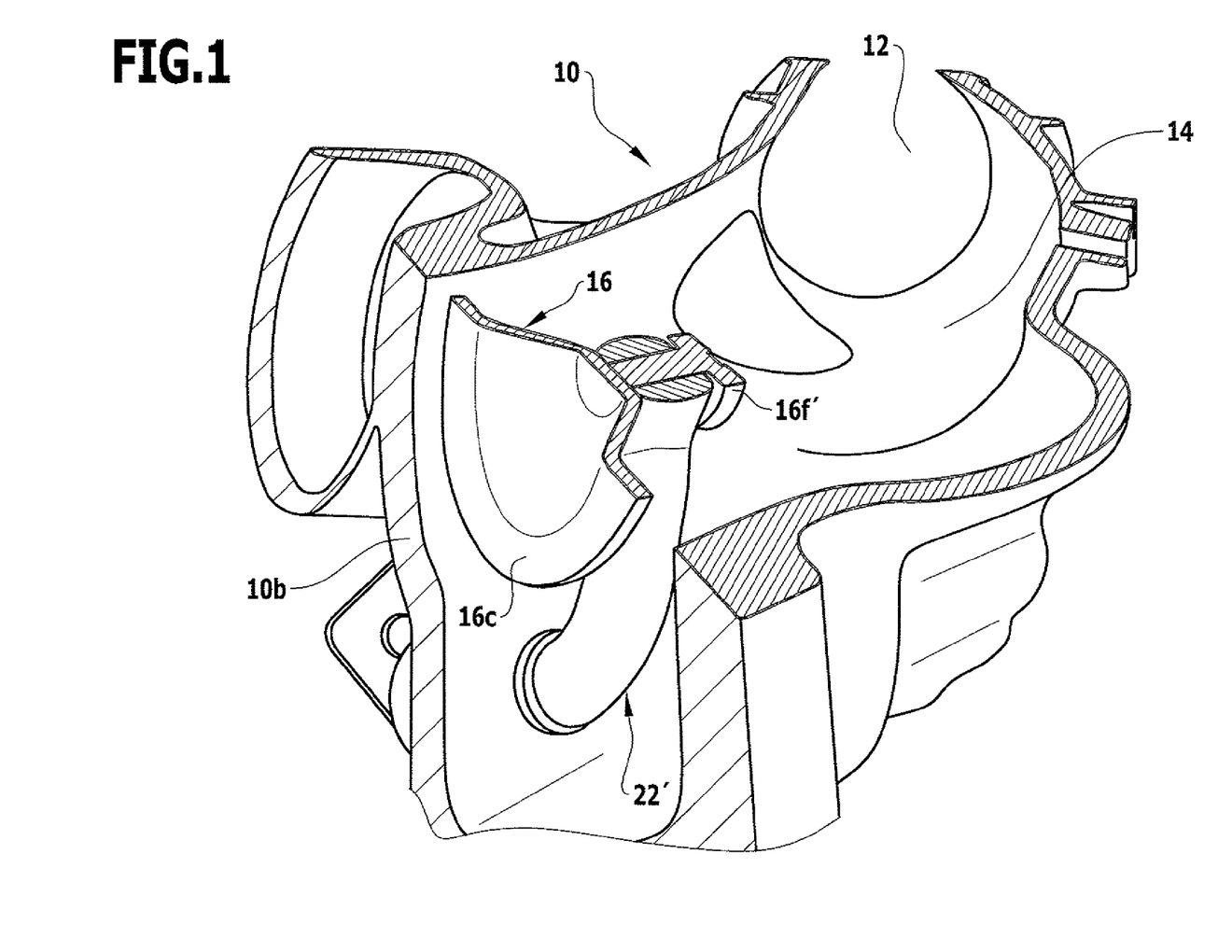
FIG. 1 shows a cut-open part of a turbine housing of a turbocharger with a valve element configured as a wastegate flap including a valve element support in an isometric representation.
Figure 2:
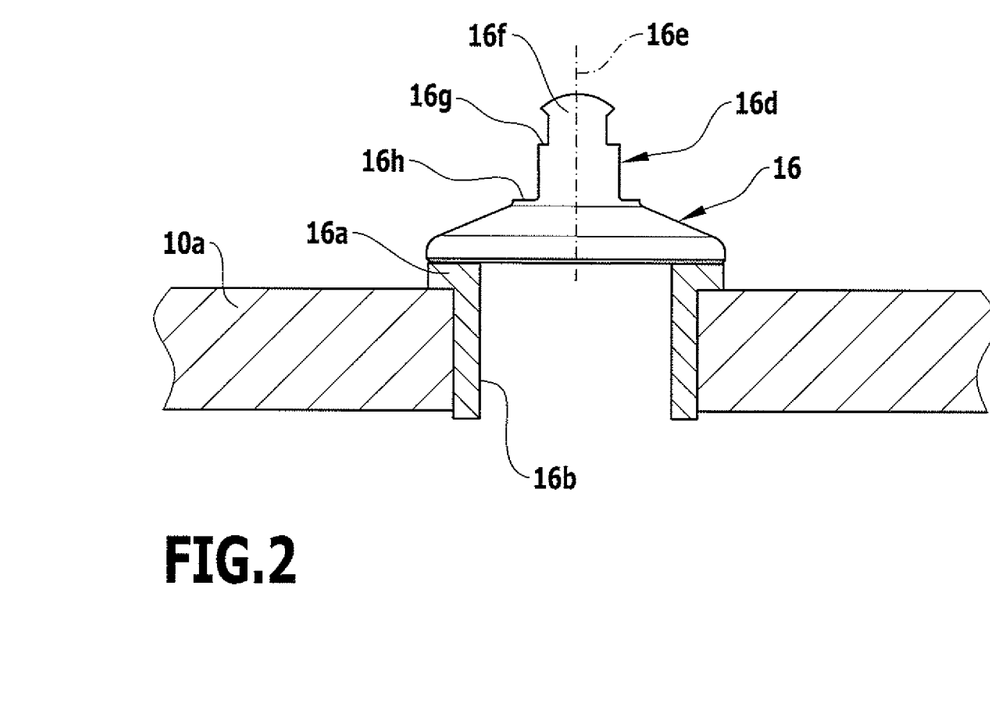
FIG. 2 shows the valve element provided with a shaft in a side view, and, in a sectional representation, a part of a wall of the turbine housing with a valve seat for the valve element.

FIG. 1 shows a part of a turbine housing 10 into which the exhaust gas flow serving to drive an exhaust gas turbocharger turbine, not shown, enters through an exhaust gas inlet opening 12. The exhaust gas inlet opening 12 connects with an exhaust gas inflow path 14 formed in the turbine housing 10. The exhaust gas inflow path 14 leads to the turbine, and a valve element 16, in this embodiment configured as a wastegate flap, is arranged in the exhaust gas inflow path 14. This valve element 16 of plate-like configuration, shown only partly in FIG. 1, can be moved in a manner described below in the exhaust gas inflow path 14 relative to the turbine housing 10, to enable an exhaust gas through-opening, not shown in FIG. 1, which is formed in the wall of the turbine housing 10 to the left of the valve element 16 to be completely closed and in as gastight a manner as possible—for this purpose a wall 10a of the turbine housing 10 shown in FIG. 2 is provided with a valve seat 16a which encloses the exhaust gas through-opening 16b, also shown in FIG. 2. As will be clear from the following, in the embodiment shown, the valve element 16 is moved in such a way that it is able not only to completely close, but also to open to a greater or lesser extent or completely the exhaust gas through-opening 16b. By means of the valve element 16, a bypass path for the exhaust gas flow, which is formed by a channel, not shown, formed in the turbine housing 10, can thus be closed or partly or completely opened in order to conduct the exhaust gas flow entering the turbine housing 10 completely, partly or not at all via the exhaust gas turbocharger turbine by the exhaust gas flow being optionally conducted partly or completely out of the exhaust gas inflow path 14 by way of the bypass path.

From FIGS. 1 and 2 it can be seen that the plate-like valve element 16 has a sealing surface 16c, in this case, of circular ring-shaped configuration, which lies in a plane and interacts with a corresponding sealing surface of the valve seat 16a. Formed on the plate-like valve element 16 is a shaft 16d, whose axis was designated 16e in FIG. 2, and whose free, in accordance with FIG. 2, upper end is provided with a thickened head 16f. Between this head and the plate-like valve element 16, the shaft 16d has an, in accordance with FIG. 2, upper annular shoulder 16g, and an, in accordance with FIG. 2, lower annular shoulder 16h is provided at the transition from the shaft to the valve element 16.

A group of components comprising the valve element, the parts carrying the latter, and the parts moving the valve element between an open position and a closed position will be described below with reference to FIGS. 3 to 6 and 6A.

Belonging to this group of components is a shaft-like spindle 20 on which is formed a valve element support 22, which extends in the manner of an arm transversely away from the spindle 20 comprising an axis 20a, and over the major part of its length has a substantially rectangular cross section and, therefore, two flat sides 22a and 22b. In the proximity of its free end, the valve element support 22 has an, in particular, circular, hole 22c, through which the shaft 16d passes, so that the annular shoulder 16h provided at the transition from this shaft to the valve element 16 can be supported on the side 22b of the valve element support 22.

Arranged between the head 16f of the shaft 16d and the valve element support 22 is a washer 24, which has two end faces 24a and 24b, preferably overall flat and parallel to each other, the latter of which is supported on the annular shoulder 16g of the shaft 16d. In accordance with the invention, the spacing of the two annular shoulders 16g and 16h from each other, the thickness of the region of the valve element support 22 provided with the hole 22c and the thickness of the washer 24 are matched so as to obtain between the washer 24 positioned by the head 16f against the annular shoulder 16g and the valve element support 22 lying against the annular shoulder 16h an annular gap in which is arranged a first ring-shaped spring element 30, through which the shaft 16d passes.

In the preferred embodiment shown, the shaft 16d provided on the valve element 16 is first passed through the hole 22c of the valve element support 22, whereupon the spring element 30 and the likewise ring-shaped washer 24 are pushed onto the shaft 16d, and the washer is positioned against the annular shoulder 16g. The free end of the shaft 16d, which at first does not yet have the head 16f, is then deformed by a kind of riveting procedure so as to produce the thickened head 16f, during formation of which the washer 24 is pressed against the annular shoulder 16g, and by means of which the valve element 16 is secured on the valve element support 22, and the spring element 30 and the washer 24 are held on the shaft 16d.

Figures 6, 6A:
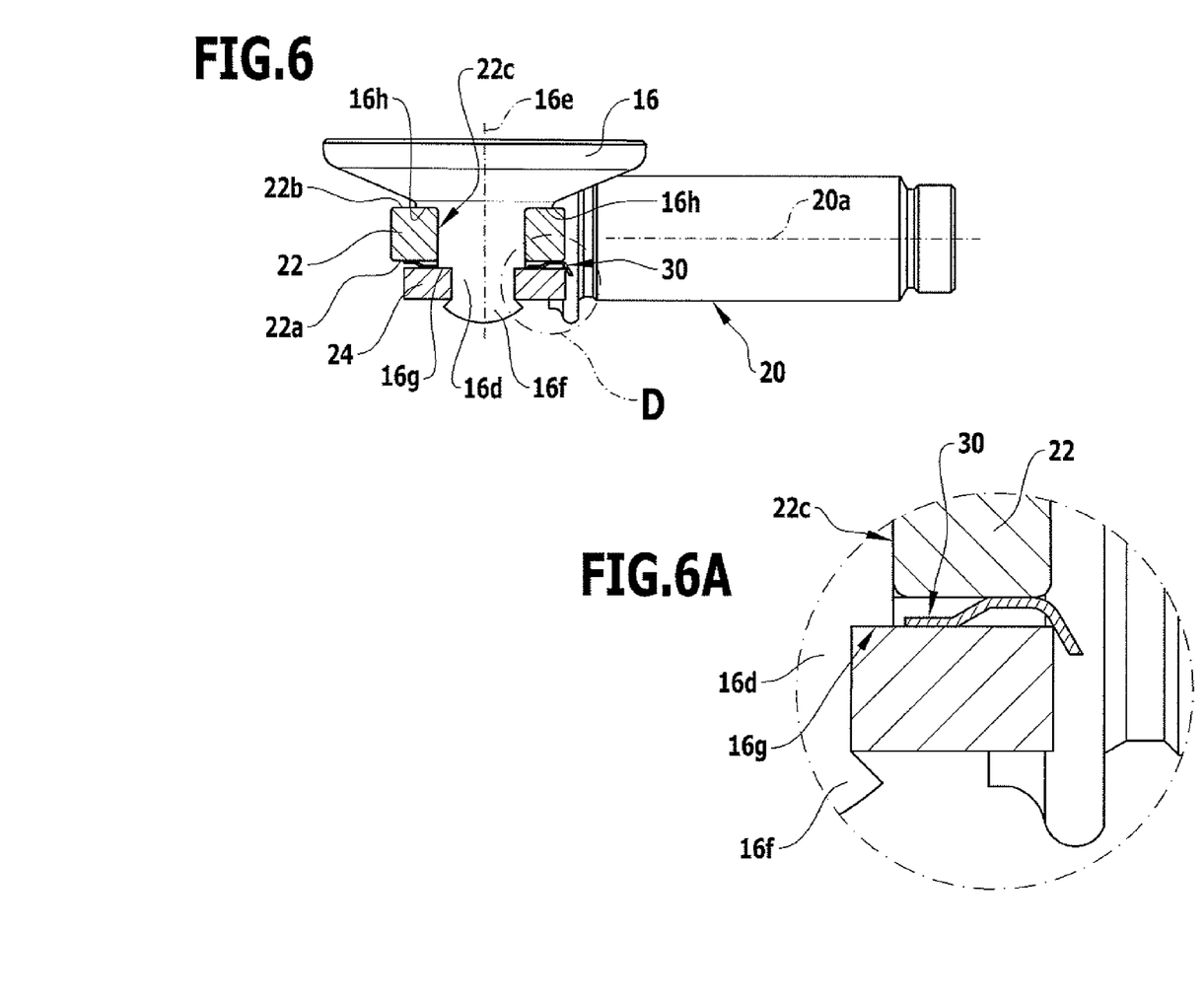
FIG. 6 shows a view of the parts shown in FIG. 4, seen in the direction of arrow C from FIG. 4, but with a region of the valve element support and a washer shown in sectional representation.
FIG. 6A shows the detail D from FIG. 6 on a larger scale.

As will be clear from FIG. 6, the spring element 30 lies with its two sides, in accordance with the invention, against flat surfaces extending perpendicularly to the axis 16e, which, in the preferred embodiment of the invention, are formed by the side 22a of the valve element support 22 and the one end face 24b of the washer 24. The design and function of the spring element 30 will be described below.

Figure 3:
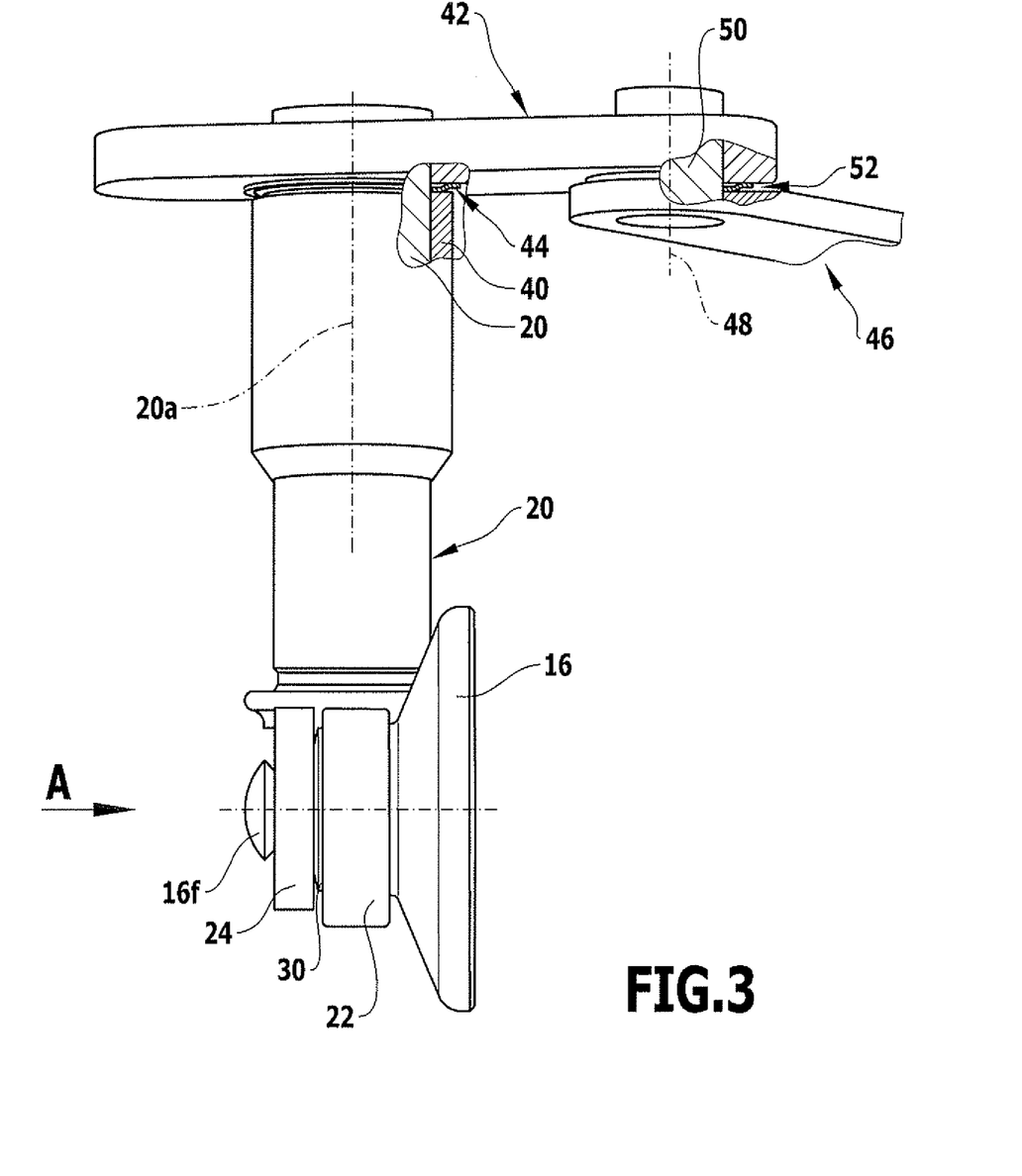
FIG. 3 shows a partly broken-open side view of a group of components, consisting of the valve element, the valve element support, a spindle held rotatably in a bearing bush and provided with the valve element support, an adjusting lever attached to the spindle, and an adjusting lever actuating element articulatedly connected to the adjusting lever.

As shown in FIG. 3, the spindle 20 is held by a bearing bush 40 and is mounted therein so as to be rotatable about the spindle axis 20. The bearing bush 40 is secured in a wall 10b, discernible from FIG. 1, of the turbine housing 10. It is, however, also to be regarded as lying within the scope of the invention that the spindle 20 is held directly in a correspondingly configured opening of the wall 10b and is mounted so as to be rotatable about the spindle axis 20a.

Figure 4:
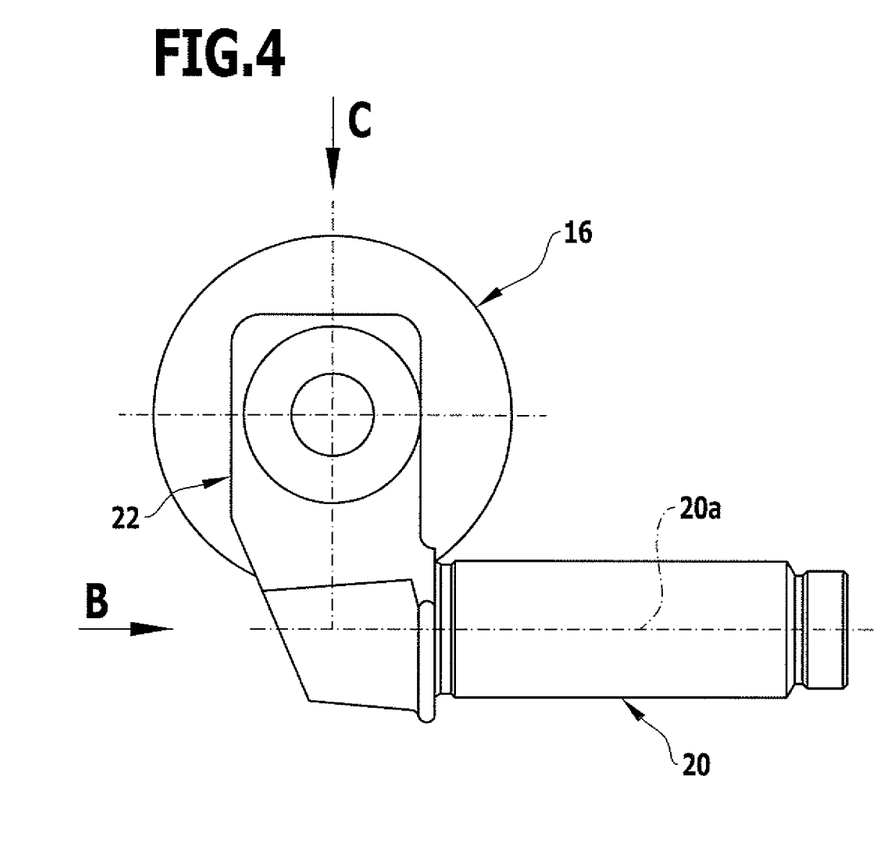
FIG. 4 shows a view of the spindle, the valve element support and the valve element, seen in the direction of arrow A from FIG. 3.
Figure 5:
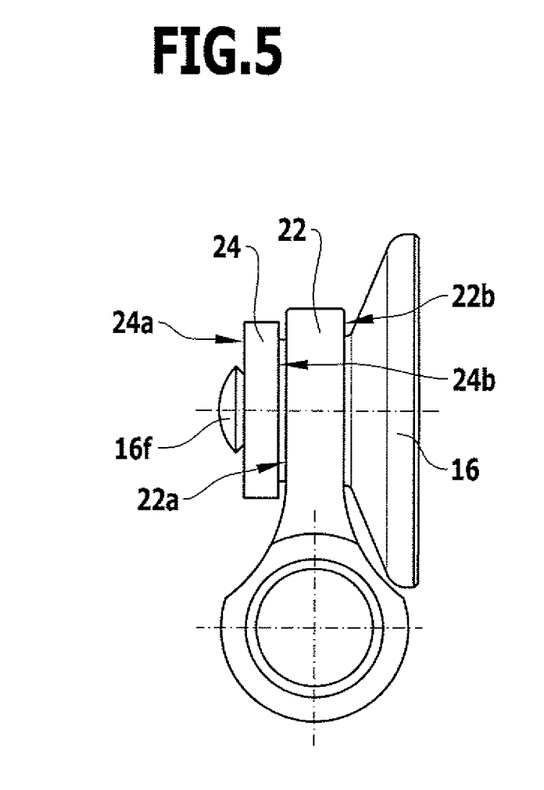
FIG. 5 shows a view of the parts shown in FIG. 4, seen in the direction of arrow B from FIG. 4.

Regarding FIG. 1, it must also be pointed out that it shows an embodiment of the valve element support, which is modified in comparison with FIG. 4 and was designated 22' in FIG. 1. Furthermore, FIG. 1 shows an alternative configuration of the free end of the shaft 16d of the valve element 16, for which reason this free shaft end forming an abutment was designated 16f' in FIG. 1—differently from the representation in FIG. 1, this abutment is, in practice, formed by a disc which is fixedly connected to the actual shaft, for example, by welding. Finally, mention is made of the fact that FIG. 1 shows an arrangement of the valve element 16 on the valve element support 22', which is not in accordance with the invention.

The, in accordance with FIG. 3, upper end of the spindle 20 passes through a hole, not discernible in FIG. 3, of an adjusting lever 42 and is connected to the latter at least in a rotationally fixed manner, but preferably also so as not to be displaceable in the direction of the spindle axis 20a. The person skilled in the art is familiar with the means required for this, which, therefore, need not be explained. Arranged between the bearing bush 40 (but optionally the wall 10b of the turbine housing 10) and the adjusting lever 42 is a ring-shaped second spring element 44 in accordance with the invention, through the opening of which the spindle 20 passes, and which lies, on the one hand, against the adjusting lever 42 and, on the other hand, against the, in accordance with FIG. 3, upper end face of the bearing bush 40, (but optionally against the wall 10b). Those regions of the adjusting lever 42 and of the end face of the bearing bush 40 (or the wall 10b) against which the spring element 44 lies are preferably so configured that they are flat and extend perpendicularly to the spindle axis 20a. The design and function of the second spring element 44 will also be described below.

An adjusting lever actuating element 46 engages the adjusting lever 42 which is rotatable together with the spindle 20 about the spindle axis 20a. In the preferred embodiment shown in FIG. 3, the adjusting lever actuating element 46 is of arm-like or lever-like configuration, but it could also have a different shape, as it need only fulfill the function of being able to pivot the adjusting lever 42 about the spindle axis 20. The adjusting lever actuating element 46 is articulated on the adjusting lever 42 in such a way that it can be pivoted relative to the adjusting lever 42 at least about a pivot axis 48 extending parallel to the axis 20a of the spindle 20. A ball-and-socket joint can, for example, be used for the articulated connection between the adjusting lever 42 and the adjusting lever actuating element 46. In the preferred embodiment shown in FIG. 3, this articulated connection is formed by a joint pin 50 whose axis coincides with the pivot axis 48, and which passes through a hole in the adjusting lever 42 and at least engages in a hole in the adjusting lever actuating element 46. The joint pin 50 can, for example, be attached to the adjusting lever actuating element 46, in particular, by welding, whereas the joint pin 50 can be rotated relative to the adjusting lever 42 about the pivot axis 48. In this case, in order to secure the adjusting lever actuating element 46 to the adjusting lever 42, there can be attached to the joint pin 50 a securing element, which lies against the, in accordance with FIG. 3, upper side of the adjusting lever 42 and is held on the joint pin 50 so as not to be displaceable in the axial direction.

Arranged, in accordance with the invention, between the adjusting lever 42 and the adjusting lever actuating element 46 is a third ring-shaped spring element 52 in accordance with the invention, through the opening of which the joint pin 50 passes, and which lies, on the one hand, against the adjusting lever 42 and, on the other hand, against the adjusting lever actuating element 46. Alternatively, however, a ring-shaped washer, through which the joint pin 50 passes, could also be provided between the spring element 52 and the adjusting lever 42 and/or the adjusting lever actuating element 46. In each case, it is preferable to so configure those surfaces against which the spring element 52 lies that these surfaces are flat and extend perpendicularly to the pivot axis 48.

With reference to FIGS. 7A to 7C, 8A to 8C and 9A to 9C, three spring elements in accordance with the invention will now be described, each of which can be used as first spring element 30, as second spring element 44 and/or as third spring element 52. However, one of the spring elements shown in FIGS. 7 and 8 will preferably be used as spring element 30, and the spring element shown in FIGS. 9A to 9C as spring element 52. In this connection, it is pointed out that the spring element 44 must in any case effect a gas sealing, in order that exhaust gases which may unavoidably penetrate a gap between the circumference of the spindle 20 and the component on which the spindle is mounted, i.e., in particular, the bearing bush 40, are unable to escape to the outside in the region of the, in accordance with FIG. 3, upper end of the bearing bush 40 or the housing wall 10b. On the other hand, the problem of gas sealing does not arise at the installation position of the spring element 30 or at the installation position of the spring element 52, and, therefore, these two spring elements need only be so configured with respect to their design, their material properties and their dimensions that a play in the direction of the axis 16e of the shaft 16d of the valve element 16 or a play in the direction of the pivot axis 48 is at least almost eliminated by these spring elements, more specifically, also under the operating temperatures of the turbocharger, which, above all, is of particular importance for the spring element 30.

Figure 7A:
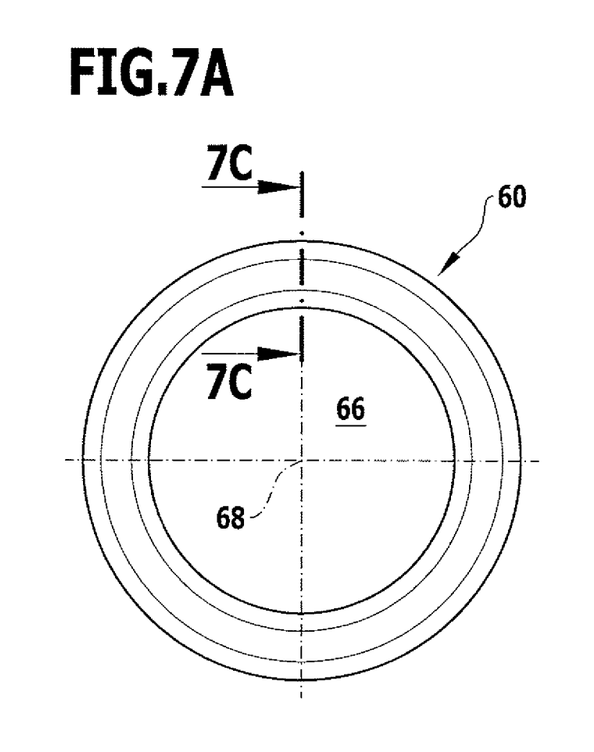
FIGS. 7A, 7B and 7C show a first embodiment of a spring element in accordance with the invention, more specifically, a plan view, a side view and a section taken along line 7C-7C from FIG. 7A.
Figure 7B:
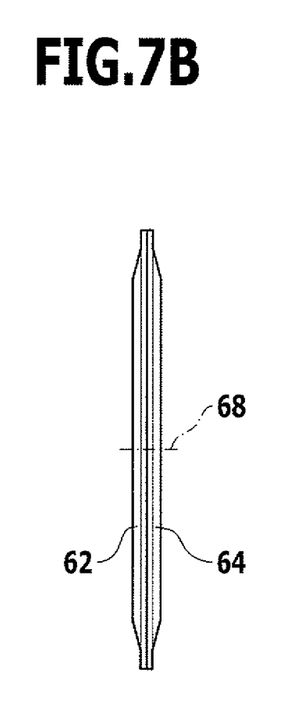
Figure 7C:
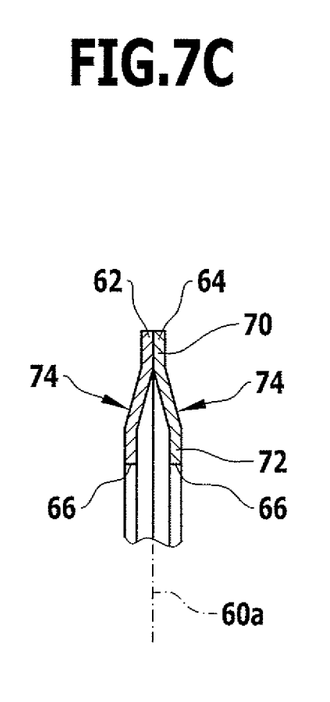
Figure 8A:
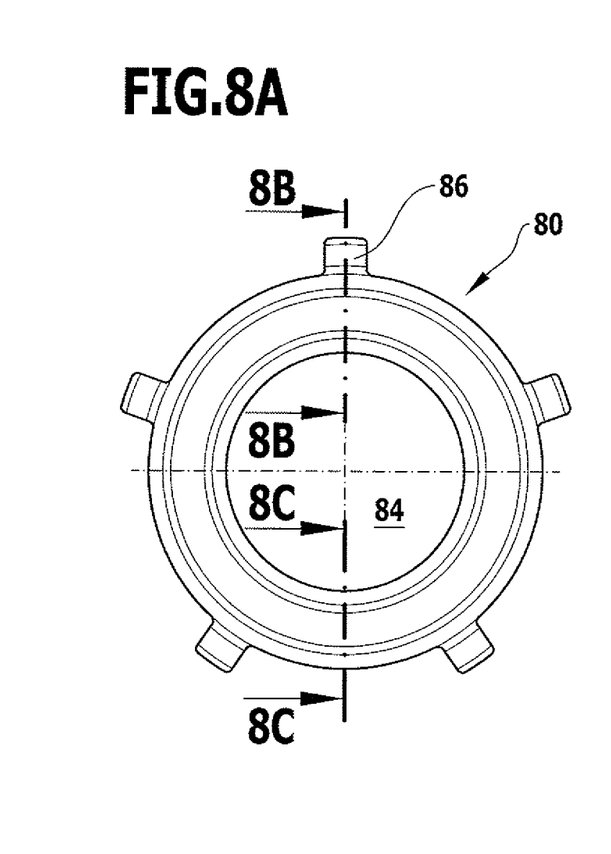
FIGS. 8A, 8B and 8C show a second embodiment of a spring element in accordance with the invention, more specifically, a plan view, a section taken along line 8B-8B and a section taken along line 8C-8C from FIG. 8A.
Figure 8B:
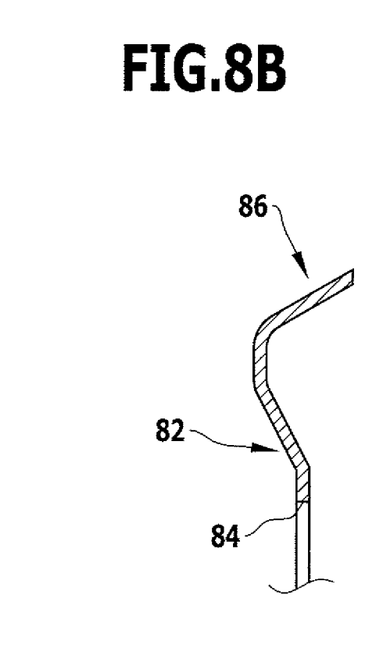
Figure 8C:
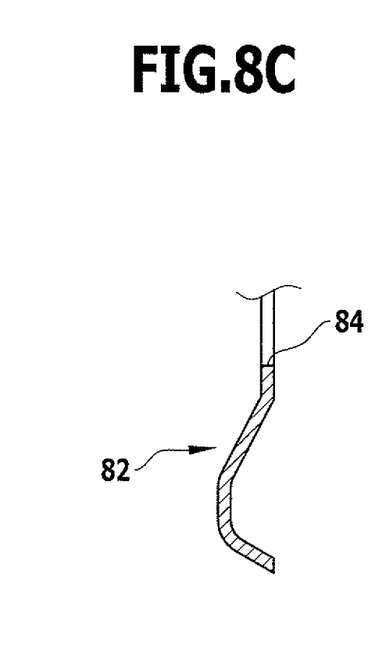
Figure 9A:
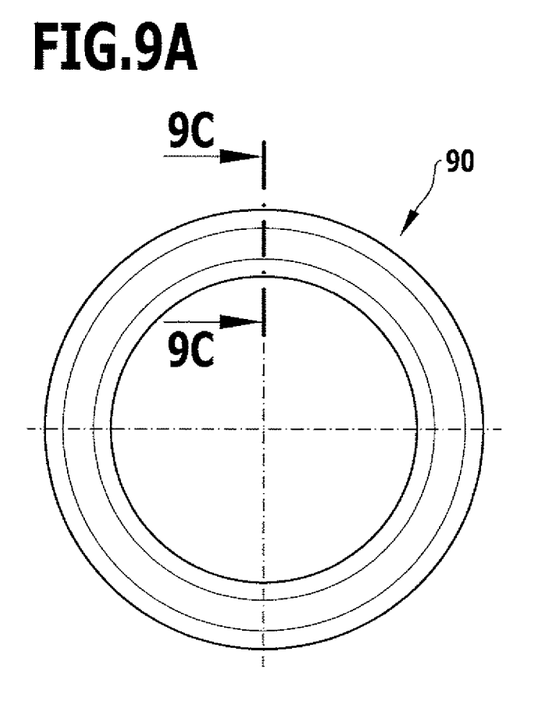
FIGS. 9A, 9B and 9C show a third embodiment of the spring element in accordance with the invention, more specifically, a plan view, a side view and a section taken along line 9C-9C from FIG. 9A.
Figure 9B:
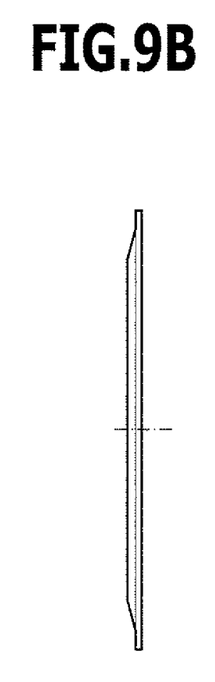
Figure 9C:
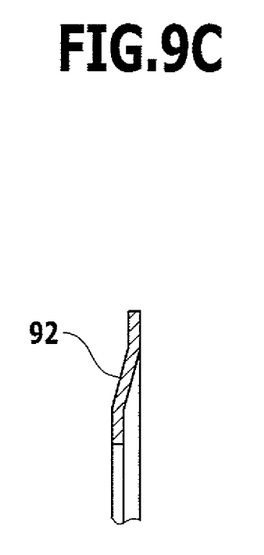

In view of the above-described installation positions of the spring elements in accordance with the invention, the reference numerals 30 and 52 used so far have not been used for the spring elements in FIGS. 7 to 9, but instead other reference numerals.

The spring element 60 in accordance with the invention, shown in FIGS. 7A to 7C, is in its entirety circular ring-shaped and of mirror-symmetrical configuration in relation to a center plane indicated in FIG. 7C and designated 60a. It consists of two circular ring-shaped spring steel sheet discs 62 and 64 and has a central opening 66 and an axis 68 extending perpendicularly to the center plane 60a. Each of the two spring steel sheet discs 62, 64 has a radially outer ring region 70 and a radially inner ring region 72, which are both flat and extend parallel to the center plane 60a, and each spring steel sheet disc has a half bead 74 between these ring regions. In the preferred embodiment, the two radially outer ring regions 70 of the two spring steel sheet discs lie against each other. It is, however, also conceivable to arrange between these two radially outer ring regions a flat, circular ring-shaped inner layer, which also consists of a high-temperature resistant steel sheet, but differently from the spring steel sheet discs 62, 64 does not have any spring steel properties. In the preferred embodiment shown, the two half beads 74 face away from each other in relation to the center plane 60*a*, so that the spring element 60, in the installed state, lies with its radially inner ring regions 72 against surface regions, which, in particular, are flat, of adjacent components. However, regions of the two spring steel sheet discs 62, 64, which have recesses and/or are provided with cutouts along the rim of the opening 68 could also take the place of the radially inner ring regions 72. Alternatively, the two components adjacent to the spring element 60 could have supporting regions for the spring element, which do not form continuously flat surfaces around the opening 68, but have, for example, depressions between flat surface regions, as it is only a question of the spring element being installed radially within its half beads 74 in a resiliently pretensioned manner in the direction of its central axis 68 between the adjacent components.

In accordance with the invention, the spring element 60 can also be modified so that the radially inner ring regions 72 of the two spring steel sheet discs 62, 64 lie against each other or against a ring-shaped inner layer, and that the half beads of the two spring steel sheet discs form a radially outwardly opening gap between them, so that the two spring steel sheet discs lie with their radially outer ring regions 70 resiliently against the adjacent components—in this case, the same then applies for the radially outer ring regions 70 and the two adjacent components as for the embodiment shown in FIGS. 7A to 7C.

It should also be mentioned that the two spring steel sheet discs 62, 64 and the optionally provided inner layer are fixedly connected to one another, in particular, by spot welding or a circumferential laser-welded seam which is closed within itself.

The spring element 80 in accordance with the invention shown in FIGS. 8A to 8C consists only of a single spring steel sheet disc with a central opening 84 and, adjacent to the latter, a half bead 82 which surrounds the opening 84 preferably in closed configuration, but may also be interrupted in the circumferential direction, for example, owing to openings punched out of the sheet metal disc or because only segments of the bead 82, which are spaced from one another in the circumferential direction, were stamped in the sheet metal disc. Advantageously, the half bead 82 is adjoined radially outwardly by a flat ring region, extending perpendicularly to the axis of the opening 84, for the sheet metal disc to lie with surface-to-surface contact against an adjacent component, it being possible for the radially outer rim of this ring region to form the outer circumference of the sheet metal disc. Particularly recommended is, however, the cross-sectional shape of the sheet metal disc, shown in the drawings, in which the said ring region is adjoined by a further ring region, inclined in relation to the axis of the opening 84, i.e., conical ring region, which differently from shown in the drawings, can continue into a third, radially outer and flat ring region of the sheet metal disc, which extends perpendicularly to the axis of the opening 84 and with which the sheet metal disc can lie with surface-to-surface contact against another adjacent component.

As shown in FIGS. 8A and 8B, the spring element 80 is provided at its outer circumference with projecting sheet metal noses 86, which project downwards beyond the plane defined by the opening 84, i.e., in the direction opposite to the direction in which the half bead 82 projects. In accordance with the invention, the spring element 80 has at least three sheet metal noses 86 which are spaced from one another in the circumferential direction of the spring element and with which the spring element is centered on an adjacent component, as is shown in FIG. 6 for the spring element 30, in order to center the latter in relation to the washer 24 and, therefore, in relation to the axis 16*e*.

Finally, FIGS. 9A to 9C show a further spring element 90 in accordance with the invention, which also consists only of a single spring steel sheet disc, which may be identical to one of the spring steel sheet discs 62 and 64 of the embodiment in accordance with FIGS. 7A to 7C, if the spring hardness of the half bead 92 of the spring element 90 is disregarded—the stiffness of the half bead 92 is preferably greater than the stiffness of the half bead 74 of one of the spring steel sheet discs 62 and 64, in order to at least almost eliminate, and just as effectively, an axial play, as is the case when the spring element 60 is used. A greater stiffness of the half bead can be achieved by corresponding design and/or dimensioning of the half bead and/or of the thickness of the spring steel sheet and/or by use of a corresponding spring steel. In this connection, it should be noted that the stiffness of a bead depends on the bead width, but, in the case of a half bead, also on the angle of inclination of the bead region extending at an incline.

Sheets made of the following steel alloys are especially recommended for the manufacture of a spring steel sheet disc in accordance with the invention:

NiCo20Cr20MoTi (2.4650), alloy DIN 17744/17750 in accordance with DIN 59746/DIN EN ISO 9445

Alloy 625 (2.4856), DIN EN 10095

Waspaloy (2.4654)

NiCr19Fe19Nb5Mo3 (2.4668) in accordance with DIN 59746/DIN EN ISO 9445.

The first aforementioned alloy is recommended, above all, for a spring element in accordance with the invention, which is installed in the same position as the spring element 30, and the last alloy is recommended especially for a spring element in accordance with the invention, which is installed in the same position as the spring element 52. Alloy 625 and Waspaloy are, in turn, recommended for spring elements, which are installed in the same position as the spring element 30.

In the bypass valve device in accordance with the invention, a spring element in accordance with the invention serves to eliminate play and not to seal off gas, above all, not to seal off gas between two components rotatable relative to each other. Therefore, embodiments of the spring element in accordance with the invention are preferred, in which the at least one spring steel sheet disc and/or the at least one bead of the spring element have a greater spring hardness than the at least one resilient sealing lip of the sealing element disclosed in DE 10 2009 030 520 A or the spring element 44 shown in the enclosed FIG. 3.

For the spring element in accordance with the invention to be arranged in accordance with the invention in the $1^{st}$ position and/or in the $2^{nd}$ position, it is, therefore, recommended that it be so configured that it generates, in the installed state, the following pressing or spring forces between the spring element and the components adjacent thereto, and, in particular, in the cold state, i.e., not when the turbocharger is in operation.

For a single-layer or multilayer spring element in accordance with the invention to be installed in the position of the spring element 30, a force range of between 150 and 300 N, in particular, between 170 and 320 N, is recommended, whereas a lower force range, namely a force range of 50 to 150 N, is recommended for a spring element to be installed in the same position as the spring element 44, as higher wear is otherwise to be expected due to relative rotational movements at this installation position.

The invention claimed is:

1. Turbocharger for a reciprocating-piston internal combustion engine, comprising an exhaust gas bypass path for controlling the size of the volumetric flow of engine exhaust gas acting upon a turbine of the turbocharger, wherein the bypass path is provided with a bypass valve device for controlling the size of the volumetric flow of exhaust gas conducted through the bypass path, the bypass valve device comprising     a plate-like valve element which has a sealing surface lying in a plane and a shaft extending away from the sealing surface, and which is movable between an open position and a closed position,     a valve seat for the valve element, the valve seat enclosing an exhaust gas through-opening and interacting with the valve element sealing surface, and     a valve element support to which the valve element is connected by means of said shaft so as to be movable at least in the direction perpendicular to the valve element seat,         wherein a spring element is arranged in a region wherein the valve element and the valve element support are connected,         wherein a play in the longitudinal direction of the valve element shaft between the valve element and the valve element support eliminated by the spring element through which the valve element shaft passes when the turbocharger is in operation,         wherein the spring element is a spring steel sheet disc defining an axis and including one half bead stamped into said spring steel sheet disc, said one half bead lying between a radially outer and a radially inner ring region of the spring steel sheet disc, enclosing the axis and being resiliently elastic in a direction of the axis of the spring steel sheet disc,         wherein the radially outer and the radially inner ring regions flat when the turbocharger is in operation each lie in a plane perpendicular to the axis of the spring steel sheet disc are offset in relation to each other in the direction of the axis of the spring steel sheet disc and connected to one another by a ring region enclosing the axis of the spring steel sheet disc and in which the spring steel sheet is inclined relative to said plane and the axis of the spring steel sheet disc,         and wherein, a configuration and dimension of the one half bead is to eliminate the play when the turbocharger is in operation.

2. Turbocharger in accordance with claim 1, wherein the spring steel used for the spring steel sheet disc consists of a nickel-based alloy.

3. Turbocharger in accordance with claim 1, wherein the width of the one half bead, measured in the radial direction, is a multiple of the height of the one half bead, measured in the axial direction of the spring element.

4. Turbocharger in accordance with claim 1, wherein the valve element shaft passes through a hole provided in the valve element support and is provided with an abutment at a free end of the valve element shaft, a ring-shaped washer, through which the valve element shaft passes, being provided between the abutment and the valve element support, and wherein the spring element is arranged between the washer and the valve element support.

5. Turbocharger in accordance with claim 1, wherein the spring element is ring shaped.

6. Turbocharger in accordance with claim 5, wherein the spring element includes a nose.

7. Turbocharger in accordance with claim 5, wherein the spring element includes a plurality of noses.

8. Turbocharger in accordance with claim 5, wherein the spring element includes at least three noses.

\* \* \* \* \*